3,402,218
BLENDING VISCOUS POLYMER SOLUTIONS
BY FORMING EMULSIONS
Howard R. Wilson, Akron, Ohio, assignor to
The General Tire & Rubber Company
Filed Apr. 20, 1965, Ser. No. 449,529
2 Claims. (Cl. 260—823)

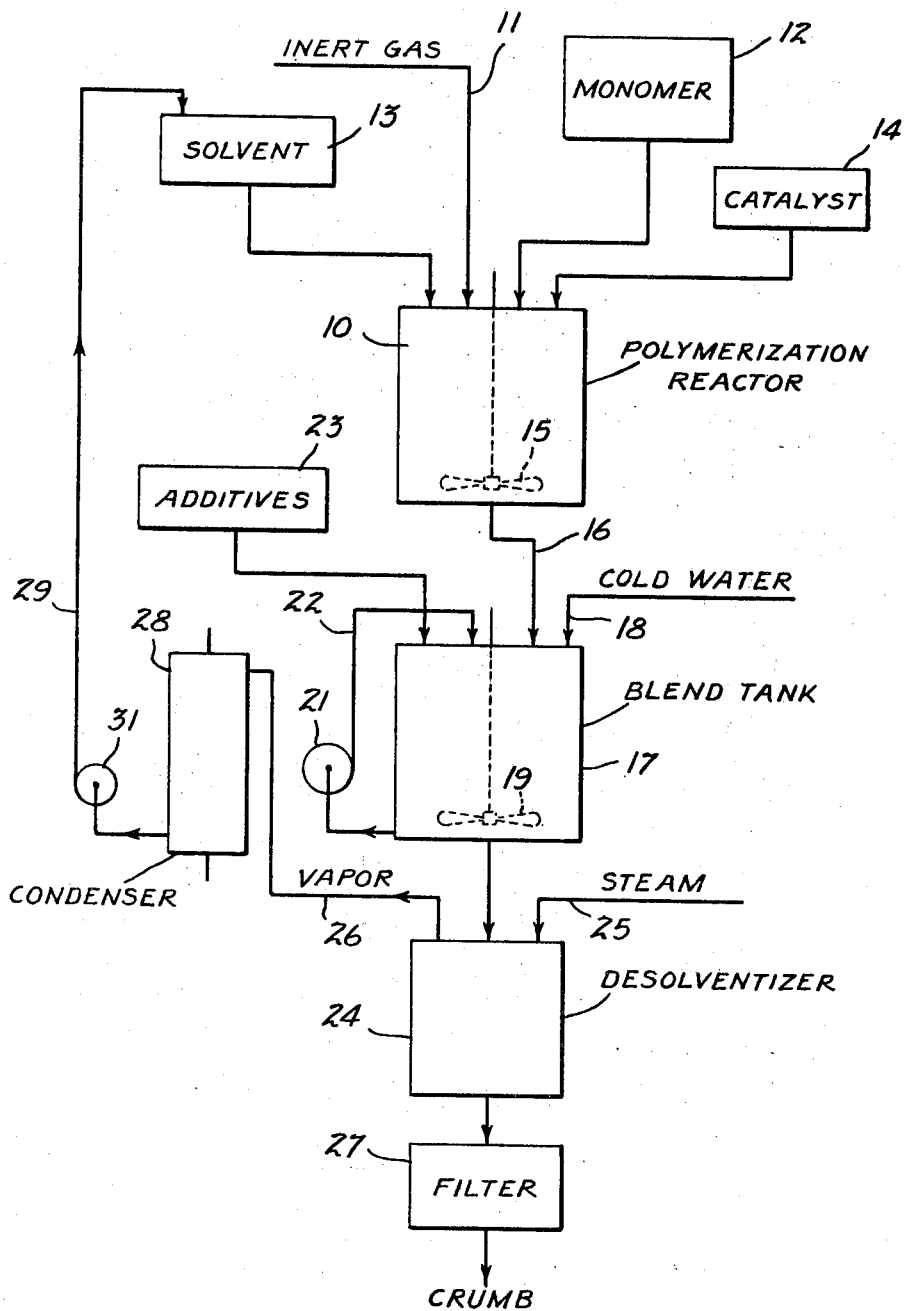

ABSTRACT OF THE DISCLOSURE

A process is disclosed of producing a polyether crumb, such as a crumb of a copolymer of propylene oxide and allyl glycidyl ether, from a viscous cement of the polyether and a solvent for the same by thoroughly mixing said cement with water to form a homogeneous aqueous dispersion or emulsion of polyether, solvent and water. The dispersion can be treated subsequently with hot water or steam to remove or vaporize the solvent and provide a mixture of polyether crumb and water from which the crumb can be recovered. By means of the present process batches of different cements, for example, from different solvent polymerization runs, in which the polymers may exhibit different Mooney viscosities can readily be handled and blended in the form of their aqueous dispersions and later converted into a crumb exhibiting a generally uniform viscosity. This process thus eliminates the need for mixing batches of viscous cements requiring large expenditures of time and power as well as the need for mixing dry polymers from separate runs in a Banbury or on a rubber mill.

---

This invention relates generally to an improved method of processing viscous polymeric compositions. More particularly, it relates to a method of fluid transferring, mixing or blending viscous solutions of cyclic oxide polymers or copolymers of high molecular weight which have been derived by the ionic polymerization of a cyclic oxide monomer in a polymerization medium such as for example a volatile hydrocarbon.

In the last few years, there has been developed a new class of synthetic elastomers based on either the homopolymerization of cyclic oxides or the copolymerization of cyclic oxides with a minor proportion of copolymerizable oxirane monomer. The polymerization products of such cyclic oxides are generally elastomers of relatively high molecular weight, molecular weights of the order of 100,000 or higher being usual. When made in volume for commercial use, they are usually prepared in a number of separate batches. Separate batches of polymer have somewhat different molecular weights and in order to provide a uniform product it is desirable to blend a number of polymer batches. Such blending creates a major problem, as hereinafter explained, when the blending is done either by masticating together solid polymers or when an attempt is made to blend gels or viscous solutions of polymer in solvent.

The above mentioned cyclic-oxide elastomers are normally prepared in the presence of an ionic catalyst in an organic solvent or polymerization media of the volatile hydrocarbon type such as hexane, heptane, benzene or toluene. For maximum efficiency and economy, the polymerization is carried to as high a polymer total solids concentration as can be utilized and still obtain flowable polymer-solvent solutions or "cements." The term "cement" is hereinafter used to refer to solutions of the polymer in a solvent. With cyclic oxide elastomeric type polymers, the total solids generally ranges between 10 and 20 parts by weight based on 100 parts total cement. Unfortunately, though, at this total solids, the cements are extremely viscous or gelatinous in nature. Though these viscous or gelatinous cements can be processed, the equipment involved in transferring the cements from one container to another, or in blending separate batches of the cements must be of a heavy-duty type. In addition, considerable time is required in the handling of such cements. The time alone, required for blending separate batches of the cements can amount to as much as about 2 to 3 days. Then, too, because the cements are of such high viscosity, usually from 50,000 to 400,000 centipoises at 25° C., blends of separately prepared batches of the cements are often not uniform throughout. Even with the best of equipment, attempts at blending separately prepared batches of the cements containing polymers of different Mooney viscosities to attain a final polymer having a desired average Mooney viscosity, result in the gelatinous mass wrapping itself around the spindle of the agitation unit. Also, for the same reason, samples taken from such purported blends for the purpose of ascertaining polymer Mooney viscosity are not representative of the entire blend.

Accordingly, it is an object of the present invention to provide a process for preparing a uniform, easily transportable composition comprising polymer and solvent.

This and other objects of the present invention will become more apparent to those skilled in the art from the following detailed description, examples and accompanying drawing which is a flow diagram of the present invention.

According to the present invention, it has been discovered that a very viscous or gelatinous polymer cement comprising an oxirane polymer and a hydrocarbon solvent, can be fluidized by combining and mixing 100 volumes of the cement with at least about 10 volumes of water at a temperature below the boiling point of the hydrocarbon solvent, to produce a low viscosity, free-flowing dispersion of polymer, solvent and water. A preferred ratio used for keeping the volume to be handled at a minimum has been in the range of 25 to 50 volumes of water per 100 volumes of polymer cement.

Referring more particularly to the drawings, a polymerization reactor 10 is flushed with an inert gas delivered to the reactor by line 11. After flushing the polymerization reactor, one or more polymerizable monomers from storage tank 12 are delivered to the reactor along with a hydrocarbon solvent from storage tank 13 and catalyst from storage tank 14. A suitable agitation means such as propeller 15 is disposed in the reactor to agitate the contents during the polymerization. After the monomer, catalyst and solvent have been delivered to the reactor and the reactor sealed, heat is applied as necessary to effect polymerization.

At the end of the polymerization reaction or when the polymerization reaction has been carried to the desired degree of conversion of monomer to polymer, the polymeric mass, which at best, is a stringy, difficult to manage mass of from about 10 to 20 parts by weight solids based on 100 parts by weight total cement, is blown or extruded by the pressure of the inert gas present in the polymerization reactor through line 16 into a blend tank 17 which has previously been supplied water from line 18. Within the blend tank is an agitation unit shown in the drawing to be a propeller 19. To avoid accumulation of a large mass around the propeller the water is most desirably agitated during the introduction of the polymeric mass, which polymeric mass is introduced into the vortex of the agitated water in order to better establish a dispersion of the polymeric mass in the water. To assist in obtaining a dispersion, a recirculation means such as pump 21 and line 22 is disposed so as to draw material from the bottom portion of the blend tank and deposit it in the top portion of the blend tank. The result is a polymeric composition or dispersion of the consistency of buttermilk.

Any cement remaining in the reactor after the initial discharge can be removed by flushing the reactor with additional solvent and agitating the cement so as to dissolve the remaining cement in the solvent. This step facilitates the transfer of the remaining cement to the blend tank.

It is also possible to introduce into the polymeric dispersion in the blend tank, compounding ingredients from storage tank 23 in the form of a slurry. For example, accelerator, dyes, sulfur, antioxidants, zinc oxide, stearic acid, oils and pigments may be added to the dispersion in the blend tank.

After the contents of the blend tank have been agitated as described above, they are passed to a desolventizer 24 which, by means of hot water or steam entering the desolventizer by line 25 at a temperature above that of the solvent, strips solvent from the dispersion. The solvent is vaporized and withdrawn by means of line 26 and may be recovered by passing through a condenser 28 and returned to the storage tank 13 for reuse by means of line 29 and pump 31. Relatively dry polymeric crumb is discharged from the desolventizer. The relatively dry crumb is passed through a filter 27 which aids in the removal of water. The crumb is then discharged onto a tray or conveyor where it can be further dried in an oven or in the open air.

Polymerizable monomers preferably used in preparing polymers treated or processed in accordance with the present invention include one or more polymerizable cyclic oxide monomers having at least one oxygen-carbon ring in which an oxygen atom is joined to two carbon atoms in the ring, which ring opens and polymerizes with the same or other cyclic oxide monomers to form a polyether.

Polymerizable monomers are of the general formula:

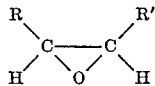

where R and R' are hydrogen, a monovalent hyrocarbon radical or a monovalent hydrocarbonoxy radical of from 1 to 10 carbon atoms. At least 50 weight percent of the monomers used in forming the polymers or copolymers possess at least one of the radicals R and R' which are hydrocarbon or hydrocarbonoxy radicals, to insure that the polymer is water insoluble.

Examples of monovalent hydrocarbon radicals are alkyl radicals as methyl, ethyl or propyl; alkenyl radicals, such as vinyl, butenyl, hexenyl, or octenyl; aryl radicals such as phenyl; alkaryl radicals such as tolyl, dimethyl phenyl or ethyl phenyl; aralkyl radicals such as benzyl, 2-phenylethyl or 3-phenylpropyl; cycloalkyl radicals such as cyclopropyl or cyclobutyl; or cycloalkenyl radicals as cyclohexenyl. R and R' may be the same or different. Examples of hydrocarbonoxy radicals are methoxy, ethoxy, allyloxy, and phenoxy.

Specific examples of polymerizable monomers are ethylene oxide, propylene oxide, 1,2-butene oxide, 2,3-butene oxide, isobutylene monoxide, styrene oxide, 1,2-pentene oxide, isopentene oxide, 1,2-diisobutylene oxide, 1,2-hexene oxide, 2,3-hexene oxide, 1,2-heptene oxide, allyl glycidyl ether, isoheptane oxide, octene oxide, methyl glycidyl ether, ethyl glycidyl ether, vinyl cyclohexene monoxide, butadiene dioxide, butadiene monoxide, 2-methyl-5,6-epoxyhexene-1 and vinyl cyclohexene dioxide.

Of these materials it is preferred that at least one be propylene oxide of the formula:

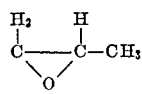

Mixtures of these cyclic oxides can be used. A very useful mixture is one containing propylene or ethylene oxide monomer and allyl glycidyl ether comonomer. The propylene oxide should be in a major amount based on weight percent of total polymer and the comonomer should be in a minor amount, based on weight percent of total polymer. Ethylene oxide, if present, should preferably not be present in an amount greater than about 25 weight percent based on 100 parts of total polymer. The use of a cyclic oxide monomer, as allyl glycidyl ether, containing aliphatic carbon-to-carbon double bond unsaturation permits the resulting polymer to be cured readily with materials such as sulfur. The polymers with no unsaturation can be cured with mixtures of sulfur and organic peroxides.

Illustrative of the ionic catalyst systems which can be used to prepare the cyclic oxide polymer cements employed in the improved process of the present invention are:

(a) The zinc dialkyl and cocatalyst ($H_2O$ or alumina oxide) as disclosed in British Patents 937,164 and 941,959 and French Patent 1,308,178, and/or (b) The metal salt and metal organic catalyst systems disclosed in U.S. Patents 3,013,439, 2,706,182, 2,706,181 and 2,706,189.

The inventive process has been found to be especially effective in fluidizing cyclic oxide polymer solutions polymerized with the zinc dialkyl and cocatalyst system, such as zinc diethyl and water, because of the gelatinous nature of these solutions.

Solvent employed in the polymerization reaction should be nonreactive toward the monomer and polymer. The monomer should be soluble in the solvent. The solvent should not form complexes with the monomer or catalyst or otherwise inhibit polymerization. When an ionic or other polymerization catalyst which is inactivated by more than critical amounts of water is used, the solvent used in the polymerization reaction should be free of water sufficient to inactivate the catalyst. Examples of useful hydrocarbon solvents are hexane, heptane, octane, nonane, xylene, benzene, and toluene. The solvents are used in the polymerization reaction in an amount sufficient to provide the cement fluidity necessary for heat transfer. Solvent is usually employed in amounts of 80 to 90 parts by weight based on 10 to 20 parts by weight of charged monomer.

Polymerization of the above monomers is usually conducted under an inert or a nonoxidizing atmosphere such as nitrogen, argon, neon, helium, krypton or vaporized solvent or monomer. The polymerization is normally conducted in a closed polymerization reactor, under pressure and at a temperature of from about 25° C. to 100° C. The polymerization reactor should be free of extraneous water that could destroy the catalyst. It is desirable to polymerize while agitating the contents of the polymerization reactor.

The polymeric product of the present invention, after it has been desolventized and dewatered to the desired extent is useful as coatings for paper and cloth fabrics, films for packaging materials, adhesives, floor mats, tiles and sponges. It may be used in the dispersed, and wholly or partially desolventized state as an aqueous dispersion, or it may be filtered and agglomerated to the solid state prior to use in forming final products. Sponge can be produced by the use of blowing agents to increase the porosity of the polymeric product. The polymeric product can be compounded so that vulcanization and desired physical properties can be obtained.

The following example serves to further illustrate the invention.

A pilot plant synthesized batch of 123 gallons of a viscous, 16.8% total solids, cement of polyether rubber having a Mooney viscosity of 61 (ML–4'–212° F.) made by polymerizing at about 25° C. to essentially 100% conversion 90 mole percent propylene oxide and 10 mole percent allyl glycidyl ether with a zinc diethyl-water catalyst which consisted of a mixture of 1 mole of diethyl zinc and 0.8 mole of water in a hexane solvent, was further processed in accordance with the improved process of this invention as follows: the viscous polymer cement was pressure transferred from the polymerization reactor in which it had been made into a 400 gallon stainless steel mixing tank equipped with two external propeller mixers and a recirculation pump and containing 50 gallons of deionized water. When about half of the polymer cement had been transferred, the propeller mixers and recirculation pump were started. After as much of the polymer solution as would readily flow out of the reactor had been transferred, the reactor was filled with 75 gallons of hexane. After two hours agitation at 176° F. the polymer cement held up in the reactor had been dissolved and the resulting hexane rinse was transferred to the mixing tank. The polymer cement, water and hexane rinse were mixed for an additional two hours to give a uniform, homogeneous mixture of a low viscosity, readily flowable polymer cement and water dispersion. This dispersion was discharged into drums for storage and was subsequently utilized by blending with other aqueous dispersions of polymer cements similarly produced. After desolventizing and drying there was obtained a single large batch of unsaturated propylene oxide/allyl glycidyl ether polymer of uniformly high quality.

What I claim is:

1. The method of making a polyether crumb which comprises (A) blending uniform easily transportable aqueous dispersions of a polyether, solvent and water, each of said aqueous dispersions having been obtained by agitating and mixing (I) a cement having a viscosity of from 50,000 to 400,000 centipoises at 25° C. and comprising (a) a water insoluble polyether of at least one polymerizable organic cyclic oxide monomer having a ring of two carbon atoms and one oxygen atom and which is polymerized through opening of the cyclic oxide ring to form said polyether and (b) a solvent for said polyether, said solvent being nonreactive to said polyether and being a hydrocarbon of from 6 to 9 carbon atoms, with (II) water in an amount of at least 10 volumes per 100 volumes of said cement and at a temperature sufficient to form a uniform, easily transportable aqueous dispersion of said polyether, said solvent and said water, and (B) desolventizing said blend of said aqueous dispersions by mixing said blend with a material selected from the group consisting of hot water and steam to strip said solvent from the blend and to form a uniform, finely divided polyether crumb.

2. The method of making a polyether crumb which comprises (A) blending uniform easily transportable aqueous dispersions of a polyether, solvent and water, each of said aqueous dispersions having been obtained by delivering a stream of a cement having a viscosity of from 50,000 to 400,000 centipoises at 25° C. and comprising (a) a water insoluble polyether of at least one polymerizable organic cyclic oxide monomer having a ring of two carbon atoms and one oxygen atom and which is polymerized through opening of the cyclic oxide ring to form said polyether and (b) a solvent for said polyether, said solvent being nonreactive to said polyether and being a hydrocarbon of from 6 to 9 carbon atoms, into the vortex of a mass of agitated water at a temperature below the boiling point of said solvent to mix said cement with said water and to form a uniform, easily transportable aqueous dispersion of said polyether, said solvent and said water, said water being used in an amount of from 25 to 50 volumes per 100 volumes of said cement, (B) desolventizing said blend of said aqueous dispersions by mixing said blend with a material selected from the group consisting of hot water and steam at a temperature above the boiling point of said solvent to remove said solvent from the blend and to form a mixture of water and uniform, finely divided, polyether crumb, and (C) separating said crumb from said water.

References Cited

UNITED STATES PATENTS

| | | | |
|---|---|---|---|
| 2,595,797 | 5/1952 | Leyonmark et al. | 260—29.2 |
| 2,953,556 | 9/1960 | Wolfe et al. | 260—29.7 |
| 2,968,575 | 1/1961 | Mallonee | 260—29.2 |
| 3,205,207 | 9/1965 | Vandenberg | 260—29.2 |
| 3,213,064 | 10/1965 | Song | 260—29.2 |
| 3,261,792 | 7/1966 | Halper et al. | 260—34.2 |
| 3,274,129 | 9/1966 | Bailey | 260—29.2 |

MURRAY TILLMAN, *Primary Examiner.*

J. C. BLEUTGE, *Assistant Examiner.*